United States Patent Office 3,532,715
Patented Oct. 6, 1970

3,532,715
SIX-MEMBERED CYCLIC CARBONATES HAVING TWO OLEFINICALLY UNSATURATED SUBSTITUENTS
Fritz Hostettler and Eugene F. Cox, Charleston, W. Va., assignors to Union Carbide Corporation, a corporation of New York
No Drawing. Continuation of application Ser. No. 494,967, Oct. 11, 1965. This application Feb. 24, 1969, Ser. No. 805,965
Int. Cl. C07d 15/00
U.S. Cl. 260—340.2
13 Claims

ABSTRACT OF THE DISCLOSURE

Novel unsaturated carbonates, such as 4-allyl-4-allyloxymethyl-2,6-dioxacyclohexanone, are prepared by phosgenation of diols in the presence of an amine. The unsaturated carbonates obtained, are useful as reactive cyclic monomers for polymerization into valuable products such as protective coatings.

This application is a continuation-in-part of U.S. patent application Ser. No. 494,967 filed Oct. 11, 1965, now abandoned.

This invention relates to novel polyunsaturated carbonates and to a process for their preparation. In one aspect, this invention relates to a class of novel carbonates having at least two olefinically unsaturated groups. In a further aspect, this invention relates to novel polyunsaturated carbonates which are useful in the preparation of a variety of polymeric compositions.

The polyunsaturated carbonate compounds which can be prepared by the process of this invention can be conveniently represented by the following formula:

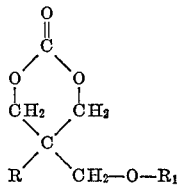

wherein R and $R_1$ represent monovalent organic groups free from acetylenic unsaturation and each containing at least one pair of carbon atoms bonded by olefinic unsaturation. Preferred compositions are those wherein each R variable individually represents an aliphatic, alicyclic, or aromatic group containing up to 24 carbon atoms. Also preferred are those compositions represented by the above formula wherein R represents a hydrocarbyloxymethyl, or hydrocarboyloxymethyl groups containing up to 24 carbon atoms; and $R_1$ represents hydrocarbyl or hydrocarboyl groups and each of said R variable contains an olefinically unsaturated double bond. Particularly preferred compositions are those wherein R represents alkenyl,
cycloalkenyl,
alkylcycloalkenyl,
cycloalkenylalkyl,
alkylcycloalkenylalkyl,
alkenyloxymethyl,
cycloalkenyloxymethyl,
alkylcycloalkenyloxymethyl,
alkenylcycloalkyloxymethyl,
alkenylaryloxymethyl,
alkenoyloxymethyl,
cycloalkenoyloxymethyl,
alkylcycloalkenoyloxymethyl,
alkenylcycloalkanoyloxymethyl, and alkenylaroyloxymethyl groups containing from 2 to 24 carbon atoms, and more preferably 2 to 18 carbon atoms, and $R_1$ represents alkenyl, cycloalkenyl, alkylcycloalkenyl, cycloalkenylalkyl, alkylcycloalkenylalkyl, alkenoyl, cycloalkenoyl, alkylcycloalkenoyl, alkenylcycloalkanoyl, and alkenylaroyl groups containing from 2 to 24 carbon atoms, and more preferably 2 to 18 carbon atoms.

Illustrative compounds encompassed by the aforementioned formula and which can be prepared by the process of the instant invention include, among others, 4-vinyl-4-allyloxymethyl-2,6-dioxacyclohexanone,
4,4-di-allyloxymethyl-2,6-dioxacyclohexanone,
4,4-diacryloyloxymethyl-2,6-dioxacyclohexanone,
4,4-dicyclohex-4-enoyloxymethyl-2,6-dioxacyclohexanone, and the like.

The novel unsaturated carbonates of the present invention are economically attractive compositions and are useful in numerous fields of application. For example, the olefinic bonds in the carbonate can be epoxidized to give novel compositions which are useful as stabilizers for various resin systems. Additionally, the unsaturated carbonates are relatively reactive materials which homopolymerize or copolymerize readily with other reactive cyclic monomers to provide a useful class of polymeric compounds. These polymers can range from viscous liquids to extremely tough solids. The very viscous liquids of relatively low molecular weight, are useful in the preparation of polishes and waxes, and as thickening agents for various lubricants. The polymers can be employed as protective coatings and impregnants. These polymers are also useful for the production of various shaped articles such as brush handles, buttons, lamp bases, toys, and the like. Moreover, since the compositions of this invention are polyfunctional in that each compound contains three reactive groups, i.e., the carbonate group and the two olefinic double bonds, they are particularly useful in those fields of application wherein polyfunctionality is desired. For example, the unsaturated carbonates are useful as comonomers in the polymerization of cyclic esters to high molecular weight polymers wherein it is desired to build a cross-linkable site, e.g., a double bond, into the polymeric network. The novel compositions of this invention are also useful as intermediates in the preparation of numerous chemical compounds, such as unsaturated carbamates, and the like.

It is, therefore, an object of the present invention to provide a class of novel unsaturated carbonates which are suitable for use in the preparation of a variety of polymeric materials. A further object of this inventton is to provide a class of novel carbonates having polyfunctional properties. Another object is to provide new compositions of matter comprising the 4,4-disubstituted-2,6-dioxacyclohexanones. A further object of this invention is to provide novel compositions of matter comprising the 2,6-dioxacyclohexanones having two groups attached at the 4-positions, each containing olefinic unsaturation. Another object is to provide a novel process for the preparation of the aforesaid compositions. These and other objects will readily become apparent to those skilled in the art in the light of the teachings herein set forth.

In its broad aspect, this invention is directed to novel unsaturated carbonates of the aforementioned general formula and to a process for their preparation. These compositions are multifunctional in nature in that each compound is characterized by the presence of the carbonate group and two olefinically unsaturated groups in the molecule.

In one embodiment, the present invention is directed to novel unsaturated carbonates represented by the formula:

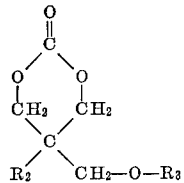

wherein $R_2$ and $R_3$ represent hydrocarbyl groups of from 2 to 24 carbon atoms, more preferably from 2 to 18 carbon atoms, and wherein each contains one olefinically unsaturated group. Preferred compositions are those where the R variables represent alkenyl, cycloalkenyl, alkylcycloalkenyl, cycloalkenylalkyl, alkenylcycloalkyl, alkenylcycloalkylalkyl, alkenylaryl and alkenylarylalkyl groups of from 2 to 24 carbon atoms.

Illustrative compounds within this embodiment and encompassed by the aforementioned formula include, among others, the mono-alkenyl, monoalkenyloxymethyl substituted 2,6-dioxacyclohexanones, e.g., 4-vinyl-4-allyloxymethyl-2,6-dioxacyclohexanone,
4-allyl-4-allyloxymethyl-2,6-dioxacyclohexanone,
4-but-3-enyl-4-pent-4-enyloxymethyl-2,6-dioxacyclohexanone,
4-pent-4-enyl-4-oct-7-enyloxymethyl-2,6-dioxacyclohexanone,
4-allyl-4-dodec-11-enyl-4-methyl-2,6-dioxacyclohexanone,
4-hex-3-enyl-4-octadec-17-enyl-2,6-dioxacyclohexanone and the like; the monoalkenyl, monocycloalkenyloxymethyl substituted 2,6-dioxacyclohexanones, e.g.,
4-allyl-4-cyclohex-3-enyloxymethyl-2,6-dioxacyclohexanone,
4-vinyl-4-(4-methylcyclohex-3-enyloxymethyl)-2,6-cyclohexanone,
4-but-3-enyl-4-cyclohex-3-enylmethyloxymethyl-2,6-dioxacyclohexanone, and the like; the monoalkenyl, monoalkenylaryloxymethyl substituted 2,6-dioxacyclohexanones, e.g.,
4-allyl-4-(4-but-3-enylphenoxymethyl)-2,6-dioxacyclohexanone, and the like;
the mono-cycloalkenyl,
mono-alkenyloxymethyl-2,6-dioxacyclohexanones, e.g.,
4-cyclohexenyl-4-allyloxymethyl-2,6-dioxacyclohexanone,
4-cyclohexenylmethyl-4-pent-4-enyloxymethyl-2,6-dioxacyclohexanone,
4-(6-methylcyclohexenylmethyl)-4-hex-5-enyloxymethyl-2,6-dioxacyclohexanone, and the like.

In a further embodiment, the present invention encompasses novel unsaturated carbonates represented by the formula:

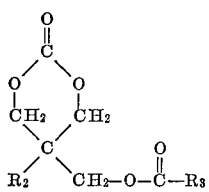

wherein $R_2$ and $R_3$ have the same values as previously indicated.

Illustrative compounds within this embodiment and encompassed by the aforesaid formula include, among others, the mono-alkenyl, mono-alkenoyloxymethyl substituted 2,6-dioxacyclohexanones, e.g., 4-vinyl-4-acryloyloxymethyl-2,6-dioxacyclohexanone,
4-allyl-4-acryloyloxymethyl-2,6-dioxacyclohexanone,
4-but-3-enyl-4-acryloyloxymethyl-2,6-dioxacyclohexanone,
4-hex-5-enyl-4-crotonoyloxymethyl-2,6-dioxacyclohexanone,
4-dodec-9-enyl-4-methacryloyloxymethyl-2,6-dioxacyclohexanone,
4-allyl-4-senecioyloxymethyl-2,6-dioxacyclohexanone, and the like; the mono-alkenyl, mono-cyclohexenoyloxymethyl substituted 2,6-dioxacyclohexanones, e.g., 4-allyl-4-cyclohex-3-enoyloxymethyl-2,6-dioxacyclohexanone,
4-vinyl-4-(4-methylcyclohex-3-enoyloxymethyl)-2,6-dioxacyclohexanone and the like; the mono-alkenyl, mono-alkenylaroyloxymethyl substituted 2,6-dioxacyclohexanones, e.g.,
4-vinyl-4-(4-prop-3-enylbenzoyloxymethyl)-2,6-dioxacyclohexanone, and the like; the mono-cycloalkenyl, mono-alkenoyloxymethyl substituted 2,6-dioxacyclohexanones, e.g., 4-cyclohexenyl-4-acryloyloxymethyl-2,6-dioxacyclohexanone,
and the like.

In a third embodiment, the present invention encompasses novel unsaturated carbonates represented by the formula:

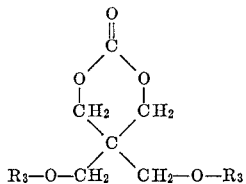

wherein $R_3$ has the same value as previously indicated.

Illustrative compounds within this embodiment and encompassed by the aforementioned formula include, among others, the dialkenyloxymethyl substituted 2,6-dioxacyclohexanones, e.g., 4-4-diallyloxymethyl-2,6-dioxacyclohexanone,
4,4-di-(pent-4-enyloxymethyl-2,6-dioxacyclohexanone,
4,4-di-(oct-7-enyloxymethyl)-2,6-dioxacyclohexanone,
4,4-di-(dodec-11-enyloxy-4-methyl)-2,6-dioxacyclohexanone,
4,4-di-(octadec-17-enyloxymethyl)-2,6-dioxacyclohexanone and the like; the di-cycloalkenyloxymethyl substituted 2,6-dioxacyclohexanones, e.g., 4,4-di-(cyclohex-3-enyloxymethyl)-2,6-dioxacyclohexanone,
4,4-di-(4-methylcyclohex-3-enyloxymethyl)-2,6-cyclohexanone,
4,4-di-(cyclohex-3-enylmethyloxymethyl)-2,6-dioxacyclohexanone, and the like; the di-alkenylaryloxymethyl substituted 2,6-dioxacyclohexanones, 4,4-di-(4-but-3-enylphenoxymethyl)-2,6-dioxacyclohexanone,
and the like.

In a further embodiment, the present invention encompasses novel unsaturated carbonates represented by the formula:

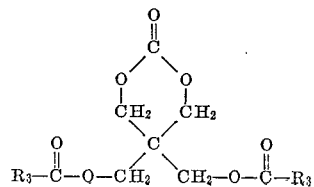

wherein $R_3$ has the same value as previously indicated.

Illustrative compounds within this embodiment and encompassed by the aforesaid formula include, among others, the di-alkenoyloxymethyl substituted 2,6-dioxacyclohexanes, e.g., 4,4-di-acryloyloxymethyl-2,6-dioxycyclohexanone,
4,4-di-crotonoyloxymethyl-2,6-dioxacyclohexanone,
4,4-di-methacryloyloxymethyl-2,6-dioxacyclohexanone,
4-4-di-senecioyloxymethyl-2,6-dioxacyclohexanone, and the like; the di-cyclohexenoyloxymethyl substituted 2,6-dioxacyclohexanones, e.g., 4,4-di-(cyclohex-3-enoyloxymethyl)-2,6-dioxacyclohexanone,
4,4-di-(4-methylcyclohex-3-enoyloxymethyl)-2,6-dioxacyclohexanone and the like; the di-alkenylaroyloxymethyl substituted 2,6-dioxacyclohexanones, e.g., 4,4-di-(4-prop-3-enylbenzoyloxymethyl)-2,6-dioxacyclohexanone, and the like.

In general, the preparation of the novel compositions of the aforementioned embodiments of this invention can be effected by a variety of means. For example, in the preparation of compounds of the first and second embodiments of this invention, an unsaturated aldehyde having two hydrogen atoms on the carbon atom in the alpha position adjacent to the carbonyl group, is subjected to an aldol condensation with at least two moles of formaldehyde followed by a Cannizzaro reaction with an additional mole of formaldehyde wherein the aldehyde is reduced to the alcohol. The following reaction illustrates the sequence of steps:

(1)
$$R_2-CH_2-CHO \xrightarrow[OH^-]{CH_2O} R_2-\underset{\underset{CH_2OH}{|}}{\overset{\overset{CH_2OH}{|}}{C}}-CHO$$

(2)
$$R_2-\underset{\underset{CH OH}{|}}{\overset{\overset{CH_2OH}{|}}{C}}-CHO \xrightarrow[OH^-]{CH_2O} R_2-\underset{\underset{CH_2OH}{|}}{\overset{\overset{CH_2OH}{|}}{C}}-CH_2OH$$

wherein $R_2$ is the same as previously indicated.

The mole ratio of formaldehyde to the olefinically unsaturated aldehyde can vary over a considerable range. For example, a mole ratio of formaldehyde to aldehyde of from about 2.0:1.0 to about 10:1.0 and more preferably from about 2.0 to 4.0:1.0 can be employed.

Prior to the low temperature phosgenation or ester interchange of the triol to form the carbonate, a second unsaturated group is introduced into the molecule. In the preparation of these novel compositions an unsaturated hydrocarbyl halide is reacted with a molar excess of the triol in an alkaline medium to obtain the hydrocarbyloxymethyl diol:

(3)
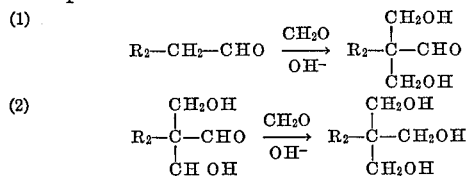

wherein $R_2$ and $R_3$ are as previously defined and X represents halide, i.e., chloride, bromide and the like.

Thereafter the unsaturated carbonate can be conveniently prepared by one or more procedures employed in the preparation of the saturated cyclic carbonates. For instance, the unsaturated carbonates can be obtained in relatively high yields by low temperature, i.e., room temperature, phosgenation of the diol in an inert medium in the presence of a tertiary amine:

(4)
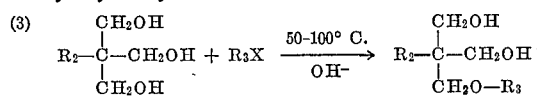
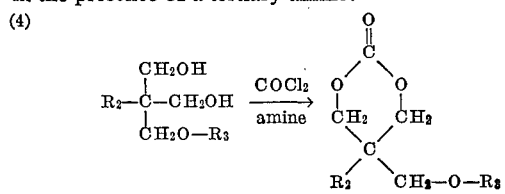

In the preparation of the compositions of the second embodiment, the second group containing the olefinic bond is introduced into the molecule by reaction of a molar excess of the unsaturated triol with an unsaturated hydrocarbyl halide, i.e., an acyl halide followed by phosgenation or ester interchange to obtain the unsaturated carbonate:

(5)
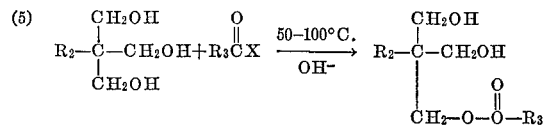

(6)
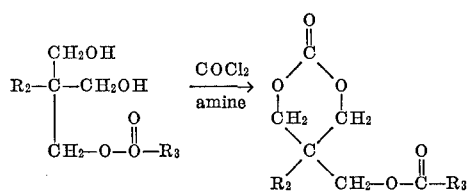

wherein $R_2$, $R_3$ and X have the same value as previously indicated.

In a preferred and more specific aspect, the triols are prepared by the dropwise addition of a 50 percent sodium hydroxide solution to a mixture of approximately one mole of the unsaturated aldehyde and approximately three moles of formaldehyde employed as 37 percent formalin solution while the mixture is continuously stirred. Addition of the hydroxide is maintained at such a rate that the reaction temperature remains within a range of from about 40° C. to about 70° C. and preferably from about 50° C. to about 55° C. When approximately one mole of the hydroxide has been added, the temperature is increased to a temperature of from about 80° C. to about 100° C. to complete the reduction of the aldehyde group. Upon completion of the reaction, the pH of the solution is adjusted to 6.0 by the addition of an acid such as formic acid, after which the solution is concentrated by distillation under reduced pressure of about 20 millimeters of mercury. The resulting two phases are separated, and the triol distilled from the organic layer. Other hydroxides such as potassium hydroxides may be used to promote both the aldol condensation step and the Cannizzaro reaction.

As previously indicated, prior to low temperature phosgenation or ester interchange, one of the hydroxyl groups of the triol is first reacted with a halide to form the ether or ester. The reaction of the triol with the halide, e.g., allyl chloride, is preferably conducted in an inert medium at a temperature of from about 50° C. to about 100° C. in the presence of a suitable base, such as sodium hydroxide, potassium hydroxide and the like.

While reaction temperatures within the aforementioned range of from about 50° C. to about 100° C., have been found desirable, temperatures above and below this range can also be employed. However, from economic consideration the optimum yield and rate of reaction are attained within the aforesaid range. The particular temperature employed will be dependent, in part, upon the triol halide starting material. A molar excess of triol is employed to maximize the yield of diol. For example it is preferred that the mole ratio of triol to halide be from about 3:1 to about 10:1, and higher.

The compositions of the third and fourth embodiments of this invention are conveniently prepared from pentaerythritol. Initially two of the hydroxyl groups of the pentaerythritol are blocked by reacting with a monocarbonyl compound such as acetone in the presence of a mineral acid or sulfonic acid catalyst, e.g., sulfuric acid ethanesulfonic acid, benzenesulfonic acid, and the like, at an elevated temperature of from about 50° C. to about 150° C. Thereafter, the two unsaturated groups are introduced into the molecule by reacting the two remaining hydroxyl groups with an appropriate hydrocarbyl halide or hydrocarboyl halide as previously indicated. Subsequent acidification of the unsaturated compound followed by phosgenation or reaction with a carbonate affords the unsaturated ether or ester carbonates of the third and fourth embodiments:

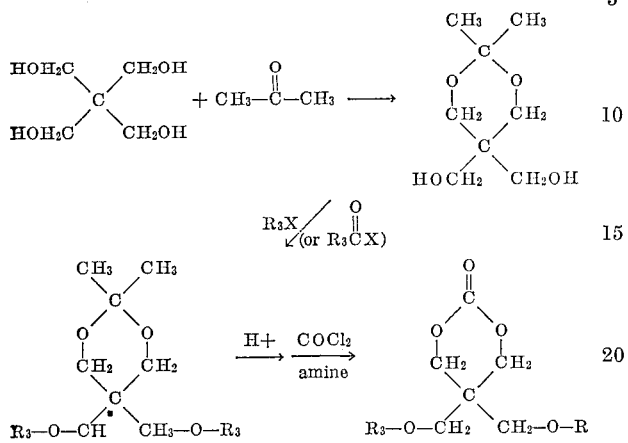

wherein $R_3$ and X have the same values as previously indicated.

In practice, the conversion of the aforementioned diols to the novel carbonates is accomplished by the addition of a cooled 10 percent solution of phosgene in toluene to a cooled solution containing an equal molar amount of the diol and an alkali metal hydroxide, alkaline earth metal hydroxide, or a tertiary amine such as anti-pyrine in a minimum volume of solvent, e.g., chloroform. The addition of phosgene solution is conducted at such a rate that the temperature is maintained within the range of from about 0° C. to about 50° C. and preferably at about 25° C. After standing, the mixture is filtered and the filtrate concentrated by evaporation and the residue dissolved in ether. Any water-soluble components are removed by water extraction, recovery of the desired reaction product effected by one of many common techniques such as filtration, distillation, extraction, vacuum sublimation, and the like.

Alternatively, the diol can be reacted with the dialkyl carbonates

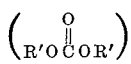

e.g., diethyl carbonate, or the alkylene carbonates, e.g., ethylene carbonate, propylene carbonate, etc., in the presence of a transesterification catalyst such as alkali metal alkoxides, alkaline earth metal alkoxides, e.g., the methoxides, ethoxides, etc., of the Group I and II metals, the titanates having the general formulae $Y_2TiO_3$ and $Y_4TiO_4$ in which the Y's are alkyl, aryl, or aralkyl radicals. The tin compounds, the organic salts of lead, and the organic salts of manganese which are described in U.S. 2,890,208 as well as the metal chelates and metal acylates disclosed in U.S. 2,878,236 can be employed as exemplified transesterification catalysts. The disclosures of the aforesaid patents are incorporated by reference into this specification. Equation infra illustrates the cyclization step whereby the unsaturated carbonate compound is formed:

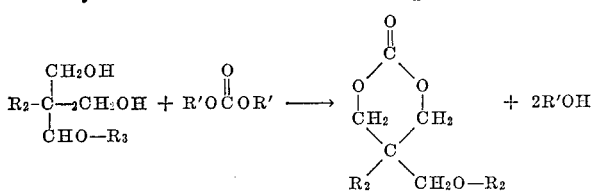

In some instances, it may be desirable to conduct one or more of the aforesaid reactions in the presence of an inert, normally liquid organic solvent, although in some cases the use of a solvent is not required. Suitable solvents include, among others, aromatic hydrocarbons, such as, toluene, xylene, benzene, naphthalene, diphenyl, amylbenzene; cycloaliphatic hydrocarbons, such as, cyclohexane, heptylcyclopentane; the chlorinated aromatic hydrocarbons, such as chlorobenzene, ortho dichlorobenzene; and the like.

The starting materials employed in the preparation of the compositions of the aforementioned embodiments are unsaturated aldehydes, unsaturated halides or unsaturated acid halides. Preferred aldehydes which can be employed include the olefinicially unsaturated aliphatic, cycloaliphatic and aromatic hydrocarbon aldehydes containing from 3 to 26 carbon atoms and more preferably, from 3 to 20 carbon atoms, and which are free of substituents on the carbon atom adjacent to the carbonyl group.

Unsaturated aldehydes which are employed in the preparation of the novel compositions of this invention include, among others, 3-butenal, 4-pentanal, 5-hexenal, 7-octenal, 10-hendecenal, 13-tetradecenal, 19-eicosenal, 25-hexacosenal, 3 -(6- methylcyclohexylmethyl-5-hexenal, 3-phenyl-4-butenal, 3-tolyl-5-hexenal, 3-benzyl-7-octenal, 3-methyl-2-cyclohex-3-enyl acetaldehyde, and the like.

As hereinbefore indicated, the second olefinic unsaturation can be introduced into the molecule by reacting a hydrocarbyl halide or acyl halide with one of the hydroxyl groups of the triol. Illustrative halides include, among others, vinyl chloride, allyl chloride, 3-butenyl chloride, 4-pentenyl chloride, 5-hexenyl chloride, 6-heptenyl chloride, 7-octenyl chloride, 8-nonenylchloride, 11-dodecenyl chloride, 13-tetradecenyl chloride, 23-tetracosenyl chloride, 3-cyclohexenyl chloride, 3-cyclohexenylmethyl chloride, 4-allylphenylmethyl chloride, styrene chloride, acrylyl chloride, 3-butenoyl chloride, 4-pentenoyl chloride, 5-hexenoyl chloride, 6-heptenoyl chloride, 7-octenoyl chloride, 8-nonenoyl chloride, 11-dodecenoyl chloride, 23-tetracosenoyl chloride, 3 - cyclohexenoyl chloride, 3-cyclohexenylmethanoyl chloride, and the like.

As previously indicated, the novel compositions which are obtained by the practice of this invention are a useful class of compounds having significant and unobvious properties in various fields of application. Due to their difunctional nature, the novel compositions are particularly attractive for use as reactive polymerizable comonomers with saturated cyclic carbonates wherein it is desired to build a cross-linkable site, e.g., a double bond into the polymeric network. The resulting linear polymers can subsequently be cross-linked or cured by one or more methods known in the art.

EXAMPLE I 4-allyl-4-allyloxymethyl-2,6-dioxacyclohexanone (A) Preparation of 2,2 - bis - (hydroxymethyl) - 4-pentenol.—To a well-stirred mixture of 756 parts 4-pentenal and 2315 parts of 37 percent formalin solution is added dropwise, 736 parts of 50 percent caustic soda at such a rate as to maintain a reaction temperature of 50°–55° C. This addition requires approximately two hours, but can be accelerated by employing external cooling. Upon completion of the caustic soda addition, the temperature is raised to 90° C. in order to complete the Cannizzaro reaction. The latter temperature is maintained for about one hour, or until the completion of the reaction is indicated by the appearance of a deep brown color. The pH of the solution is then adjusted to 6.0 by the addition of formic acid, after which the aqueous solution is concentrated by distillation at 100 millimeters of mercury pressure, 1404 parts of water being stripped over head. At this point, stirring is discontinued, the product is allowed to layer out, and the two layers are separated mechanically.

To the upper layer (1567 parts) is added 2499 parts of methyl isobutyl ketone, after which drying is completed at 100 millimeters pressure by removing water from the methyl isobutyl ketone-water constant boiling mixture. The temperature is then raised to 90°–95° C.

and the mixture filtered by suction through a sintered glass funnel to remove any sodium formate which has separated from solution during the azeotropic drying. The filtrate is chilled to −10° C. and crude triol (830 parts), which separates out as a crystalline solid, is recovered by filtration.

To the filtrate (2631 parts) is added the water layer (829 parts) from the initial separation, the recovered sodium formate, and 100 parts of water washings. The mixture is first dried at 100 millimeters by removing water from the methyl isobutyl ketone water constant boiling mixture, then heated to 90°–95° C. and filtered as before to remove sodium formate. The filtrate (2487 parts) is then concentrated to a volume of 300–500 cc. by distillation at 100 mm., after which the concentrated solution is chilled to −10° C. The crude triol (130 parts) which crystallizes is recovered, as before, by filtration.

The over-all yield of crude material is 960 parts, or 73.7 percent of the theoretical amount. The yield based on material recrystallized from methylisobutylketone is 54.4 percent of the theoretical quantity. A sample of pure material had a melting point of 90–91° C. and the following analysis:

Calculated (percent): C, 57.6; H, 9.6. Found (percent): C, 57.6; H, 9.8.

(B) Preparation of 2-allyloxymethyl-2-hydroxymethyl-4-pentenol.—To a reaction flask equipped with stirrer, condenser and thermometer are charged 2 mols of 2,2-bis(hydroxymethyl)-4-pentenol and 1500 milliliters of dioxane. One mol of sodium methoxide is then added, the reactant mixture is heated to 80 C., and the co-product methanol is removed via distillation. The reactants are then cooled to 10° C. and one mol of allyl chloride is added over a period of one hour while the reactants are well agitated. The reactants are heated to reflux and agitated for one hour. The dioxane is now removed via distillation and the product mix is diluted with 200 milliliters of water. The reactant mixture is subjected to a continuous extraction with chloroform for a period of 48 hours. The chloroform extract is dried, the chloroform is removed via distillation and the residue is subjected to a vacuum of 1 mm. Hg at which pressure the allyl ether is separated from the excess 2,2-bis(hydroxymethyl)-4-pentenol by distillation. The resulting 2-allyloxymethyl-2-hydroxymethyl-4-pentenol product is identified by elemental analysis and by analysis of the hydroxyl groups with phthalic anhydride.

(C) Preparation of 4-allyloxymethyl-4-allyl-2,6-dioxacyclohexanone.—A cooled 10 percent solution of 0.1 mole of phosgene in toluene is added with stirring to a cooled solution of 0.1 mole of 2-allyloxymethyl-2-hydroxymethyl-4-pentenol and 0.2 mole of antipyrine in a minimum volume of chloroform, at such a rate that the temperature is maintained at about 25° C. the mixture is then allowed to remain overnight at this temperature, then filtered to remove the antipyrine hydrochloride. The filtrate is concentrated by evaporating the bulk of the toluene-chloroform solvent, and the residue is dissolved in ether. The water soluble components are removed by water extraction, the ether layer dried and concentrated by removal of the solvent. The unsaturated carbonate is removed by distillation. Infrared analysis indicates that the product obtained is in agreement with that of the assigned structure.

EXAMPLE II 4-allyl-4-acryloyloxymethyl-2,6-dioxacyclohexanone (A) Preparation of 2-hydroxymethyl-2-acryloyloxymethyl pentenol.—To a reactor flask equipped with stirrer, thermometer, and distillation column, there is charged 2 mols of 2,2-bis(hydroxymethyl)-4-pentenol, one mol of methyl acrylate, 500 milliliters of toluene, 0.5 g. of hydroquinone, and 0.3 g. of sodium. The reactants are heated to about 100° C. and over a period of 3 hours the resulting co-product methanol is removed via distillation. After removal of the toluene in vacuo, the resulting ester is separated from 2,2-bis(hydroxymethyl)-4-pentenol by distillation at 0.5 mm. Hg. The distillate is stabilized against polymerization by addition of 0.1 percent hydroquinone. Redistillation of the crude ester at a pressure of 0.5 mm. Hg results in the product 2-hydroxymethyl-2-acryloyloxymethyl-4-pentenol as confirmed by elemental analysis.

(B) Preparation of 4-allyl-4-acryloyloxymethyl-2,6-dioxyacyclohexanone.—A cooled 10 percent solution of 0.1 mole of phosgene in toluene is added with stirring to a cooled solution of 0.1 mole of 2-hydroxymethyl-2-acryloyloxymethyl-4-pentenol and 0.2 mole of antipyrine in a minimum volume of chloroform at such a rate that the temperature is maintained at about 25° C. the mixture is then allowed to remain overnight at this temperature, then filtered to remove the antipyrine hydrochloride. The filtrate is concentrated by evaporating the bulk of the toluene-chloroform solvent, and the residue is dissolved in ether. The water soluble components are removed by water extraction, the ether layer dried and concentrated by removal of the solvent. The unsaturated carbonate is removed by distillation. Infrared analysis indicates that the product obtained is in agreement with that of the assigned structure.

EXAMPLE III 4,4-diallyloxymethyl-2,6-dioxacylclohexanone (A) Preparation of 2,2-dimethyl-5,5-dimethylol-1,3-dioxacyclohexane.—To a reaction vessel there are charged 58 grams of acetone, 136 grams of pentaerythritol, and 1 gram of p-toluenesulfonic acid. The resulting admixture is refluxed until the acetone is completely reacted. Distillation of the resulting reaction product mixture followed by further purification of the distillate gives a solid product identified as 2,2-dimethyl-5,5-dimethylol-1,3-dioxacyclohexane.

(B) Preparation of 2,2-dimethyl-5,5-diallyloxymethyl-1,3-dioxacyclohexane.—To a reaction flask equipped with stirrer, condenser, and thermometer are charged 1 mol of 2,2-dimethyl-5,5-dimethylol - 1,3 - dioxacyclohexane and 1500 milliliters of dioxane. One mol of sodium methoxide is then added, the reactant mixture is heated to 80° C., and the co-product methanol is removed via distillation. The reactants are then cooled to 10° C. and three mols of allyl chloride are added over a period of one hour while the reactants are well agitated. The reactants are heated to reflux and agitated for one hour. The dioxane is now removed via distillation and the product mix is diluted with 200 milliliters of water. The reactant mixture is subjected to a continuous extraction with chloroform for a period of 48 hours. The chloroform extract is dried, the chloroform is removed via distillation and the residue is subjected to a vacuum of 1 mm. Hg at which pressure the diallyl ether is separated from any 2,2-dimethyl-5,5-dimethylol-1,3-dioxacyclohexane by distillation. The resulting 2,2-dimethyl - 5,5 - diallyloxymethyl - 1,3 - dioxacyclohexane is identified by elemental analysis. Thereafter, the 2,2-dimethyl-5,5-diallyloxymethyl-1,3-dioxacyclohexane is refluxed in the presence of a mineral acid, such as sulfuric acid, and dimethylol diallyloxymethyl methane recovered.

(C) Preparation of 4,4-diallyloxymethyl-2,6-dioxacyclohexanone.—To a 4-neck flask equipped with air stirrer, thermometer, and distillation column, there are charged one mol of dimethylol diallyloxymethyl methane, 1.1 mols of diethyl carbonate, 2500 milliliters of toluene, and 1.0 gram of sodium. The resulting admixture is heated to about 100° C., and over a period of about 2 hours, the ethanol co-product is removed as it is formed via distillation. The bulk of the toluene is then distilled under reduced pressure. Further reduction in the pressure, e.g., to about 1–2 mm. of Hg, essentially removes the remaining volatiles. The resulting residue is purified and identified as 4,4-diallyloxymethyl-2,6-dioxacyclohexanone by inspection of its infrared absorption spectrum and by analysis for the carbonate group.

EXAMPLE IV

4,4-diacryloyloxymethyl-2,6-dioxacyclohexanone (A) Preparation of 2,2-dimethyl-5,5-dimethylol-1,3-dioxacyclohexane.—To a reaction vessel there are charged 58 grams of acetone, 136 grams of pentaerythritol, and 1 gram of p-toluenesulfonic acid. The resulting admixture is refluxed until the acetone is completely reacted. Distillation of the resulting reaction product mixture followed by further purification of the distillate gives a solid product identified as 2,2-dimethyl-5,5-dimethylol-1,3-dioxacyclohexane.

(B) Preparation of 2,2 - dimethyl-5,5-diacryloyloxymethyl - 1,3 - dioxacyclohexane. — To a reactor flask equipped with stirrer, thermometer, and distillation column, there is charged 1 mol of 2,2-dimethyl-5,5-dimethylol-1,3-dioxacyclohexane, three mols of methyl acrylate, 500 milliliters of toluene, 0.5 g. of hydroquinone, and 0.3 g. of sodium. The reactants are heated to about 100° C. and over a period of 3 hours the resulting co-product methanol is removed via distillation. After removal of the toluene in vacuo, the resulting diester is separated from any 2,2-dimethyl-5,5-dimethylol-1,3-dioxacyclohexane by distillation at 0.5 mm. Hg. The distillate is stabilized against polymerization by addition of 0.1 percent hydroquinone. Redistillation of the crude ester at a pressure of 0.5 mm. Hg results in the product 2,2-dimethyl-5,5 - diacryloyloxymethyl-1,3-dioxacyclohexane as confirmed by elemental analysis. Thereafter, the 2,2-dimethyl-5,5-diacryloyloxymethyl-1,3-dioxacyclohexane is refluxed in the presence of a mineral acid such as sulfuric acid, and dimethylol diacryloyloxymethyl methane recovered.

(C) Preparation of 4,4-diacryloyloxymethyl-2,6-dioxacyclohexanone.—To a 4-neck flask equipped with air stirrer, thermometer, and distillation column, there are charged one mol of dimethylol diacryloyloxymethyl methane, 1.1 mols of diethyl carbonate, 2500 milliliters of toluene, and 1.0 gram of sodium. The resulting admixture is heated to about 100° C., and over a period of about 2 hours, the ethanol co-product is removed as it is formed via distillation. The bulk of the toluene is then distilled under reduced pressure. Further reduction in the pressure, e.g., to about 1–2 mm. of Hg, essentially removes the remaining volatiles. The resulting residue is purified and identified as 4,4-diacryloyloxymethyl-2,6-dioxacyclohexanone by inspection of its infrared absorption spectrum and by analysis for the carbonate group.

Although the invention has been illustrated by the preceding examples, it is not to be construed as limited to the materials employed therein, but rather the invention encompasses the generic area as hereinbefore disclosed. Various modifications and embodiments of this invention can be made without departing from the spirit and scope thereof.

What is claimed is:

1. The unsaturated carbonate of the formula:

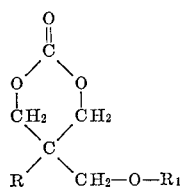

wherein R represents a member selected from the class consisting of hydrocarbyl, hydrocarbyloxymethyl or hydrocarboyloxymethyl and $R_1$ represents a member selected from the class consisting of hydrocarbyl and hydrocarboyl; said R and $R_1$ being free of acetylenic unsaturation, polycyclic aliphatic groups and polynuclear aromatic groups, said R and $R_1$ each containing from 2 to 24 carbon atoms, and each containing one pair of carbon atoms bonded by olefinic unsaturation.

2. The unsaturated carbonate of the formula:

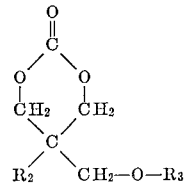

wherein $R_2$ and $R_3$ each represent hydrocarbyl groups of from 2 to 24 carbon atoms and wherein each contains one pair of carbon atoms bonded by olefinic unsaturation, said $R_2$ and $R_3$ being free of acetylenic unsaturation, polycyclic aliphatic groups and polynuclear aromatic groups.

3. The unsaturated carbonate of the formula:

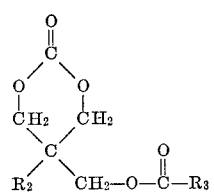

wherein $R_2$ and $R_3$ each represent hydrocarbyl groups of from 2 to 24 carbon atoms and wherein each contains one pair of carbon atoms bonded by olefinic unsaturation, said $R_2$ and $R_3$ being free of acetylenic unsaturation, polycyclic aliphatic groups and polynuclear aromatic groups.

4. The unsaturated carbonate of the formula:

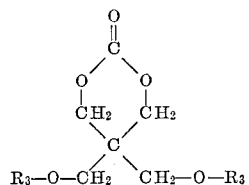

wherein each $R_3$ represents a hydrocarbyl group of from 2 to 24 carbon atoms and contains one pair of carbon atoms bonded by olefinic unsaturation, said $R_3$ being free of acetylenic unsaturation, polycyclic aliphatic groups and polynuclear aromatic groups.

5. The unsaturated carbonate of the formula:

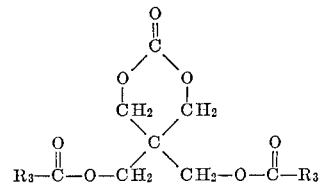

wherein $R_3$ represents a hydrocarbyl group of from 2 to 24 carbon atoms and contains one pair of carbon atoms bonded by olefinic unsaturation, said $R_3$ being free from acetylenic unsaturation, polycyclic aliphatic groups and polynuclear aromatic groups.

6. 4-alkenyl-4-alkenyloxymethyl - 2,6 - dioxacyclohexanone, wherein said alkenyls each contain 2 to 24 carbon atoms and one olefinic group.

7. 4-alkenyl - 4 - alkenoyloxymethyl-2,6-dioxacyclohexanone, wherein said alkenyl and alkenoyl each contain 2 to 24 carbon atoms and one olefinic group.

8. 4,4 - dialkenyloxymethyl - 2,6 - dioxacyclohexanone, wherein said alkenyls are the same and each contain 2 to 24 carbon atoms and one olefinic group.

9. 4,4-dialkenoyloxymethyl - 2,6 - dioxacyclohexanone, wherein said alkenoyls are the same and each contain 2 to 24 carbon atoms and one olefinic group.

10. 4-allyl-4-allyloxymethyl-2,6-dioxacyclohexanone.
11. 4-allyl-4-acryloyloxymethyl-2,6-dioxacyclohexanone.
12. 4,4-diallyloxymethyl-2,6-dioxacyclohexanone.
13. 4,4-diacryloyloxymethyl-2,6-dioxacyclohexanone.

References Cited

UNITED STATES PATENTS

| 2,924,607 | 2/1960 | Pattison | 260—340.2 |
| 2,937,119 | 5/1960 | Berger et al. | 260—482 |

OTHER REFERENCES

Ind. & Eng. Chem.; vol. 50, May–August 1958; Greensfan, p. 861.

HENRY R. JILES, Primary Examiner

S. D. WINTERS, Assistant Examiner

U.S. Cl. X.R.

260—77.5, 599, 601, 598, 617, 618, 635, 615, 468, 476, 486, 340.7